(12) United States Patent
McLean et al.

(10) Patent No.: US 8,906,185 B2
(45) Date of Patent: Dec. 9, 2014

(54) LAMINATE

(75) Inventors: Andrew Fenwick McLean, Reading (GB); Victor Sachs, Sanderstead (GB); Craig Warren Thornhill, Thatcham (GB)

(73) Assignee: Selig Sealing Products, Inc., Forrest, IL (US)

( * ) Notice: Subject to any disclaimer, the term of this patent is extended or adjusted under 35 U.S.C. 154(b) by 738 days.

(21) Appl. No.: 12/519,887

(22) PCT Filed: Dec. 14, 2007

(86) PCT No.: PCT/US2007/087520
§ 371 (c)(1),
(2), (4) Date: Aug. 18, 2009

(87) PCT Pub. No.: WO2008/079730
PCT Pub. Date: Jul. 3, 2008

(65) Prior Publication Data
US 2010/0047552 A1    Feb. 25, 2010

(30) Foreign Application Priority Data
Dec. 20, 2006    (EP) .................................... 06126645

(51) Int. Cl.
*B32B 7/12* (2006.01)
*B32B 37/12* (2006.01)
*B65D 51/20* (2006.01)
*B32B 27/08* (2006.01)
*B32B 37/20* (2006.01)
*B32B 37/15* (2006.01)

(52) U.S. Cl.
CPC ................ *B65D 51/20* (2013.01); *B32B 27/08* (2013.01); *B32B 37/203* (2013.01); *B32B 37/153* (2013.01); *B32B 2310/024* (2013.01); *B32B 2435/00* (2013.01); *B65D 2577/2041* (2013.01)

USPC ....................................... 156/244.11; 156/324

(58) Field of Classification Search
CPC ..................... B32B 2310/024; B32B 2435/00; B32B 27/08; B32B 37/153; B32B 37/203
USPC ............................................ 156/324, 244.11
See application file for complete search history.

(56) References Cited

U.S. PATENT DOCUMENTS 3,620,898 A    11/1971 Harris et al.
3,938,686 A    2/1976 Milligan et al.
(Continued)

FOREIGN PATENT DOCUMENTS

AT    501 393 A1    8/2006
AT    11 738 U1    4/2011
(Continued)

OTHER PUBLICATIONS

European Patent Office Extended European Search Report for European Patent Application 06126645.8 dated May 7, 2007 (5 pages).

(Continued)

*Primary Examiner* — Philip Tucker
*Assistant Examiner* — Vicki Wu
(74) *Attorney, Agent, or Firm* — Fitch, Even, Tabin & Flannery LLP

(57) ABSTRACT

A method is provided for producing a primary laminate including a tabstock in which a seal laminate including a foil layer and a top foam layer, a tabstock and a plastic film stock are fed to a laminating station. At the lamination station, a curtain of polymeric adhesive is extruded between the plastics film stock and the top face of the primary substrate, which is partly comprised of the top face of the tabstock and partly comprised of the top foam layer of the seal laminate. Use of primary laminates obtained by such a process to form seals for sealing a container, for food or drink stored at low temperatures, is also described.

25 Claims, 4 Drawing Sheets

(56) References Cited

U.S. PATENT DOCUMENTS

| | | | |
|---|---|---|---|
| 4,133,796 A | 1/1979 | Bullman | |
| 4,206,165 A | 6/1980 | Dukess | |
| 4,416,937 A | 11/1983 | Metzger | |
| 4,452,842 A | 6/1984 | Borges et al. | |
| 4,582,735 A | 4/1986 | Smith | |
| 4,679,519 A * | 7/1987 | Linville | 114/102.31 |
| 4,741,791 A | 5/1988 | Howard et al. | |
| 4,801,647 A | 1/1989 | Wolfe, Jr. | |
| 4,837,061 A | 6/1989 | Smits et al. | |
| 4,892,209 A | 1/1990 | Dorfman et al. | |
| 4,934,544 A | 6/1990 | Han et al. | |
| 4,960,216 A | 10/1990 | Giles | |
| 4,961,986 A | 10/1990 | Galda et al. | |
| 5,004,111 A | 4/1991 | McCarthy | |
| 5,015,318 A | 5/1991 | Smits et al. | |
| 5,055,150 A | 10/1991 | Rosenfeld et al. | |
| 5,057,365 A | 10/1991 | Finkelstein et al. | |
| 5,071,710 A | 12/1991 | Smits et al. | |
| 5,098,495 A | 3/1992 | Smits et al. | |
| 5,149,386 A | 9/1992 | Smits et al. | |
| 5,178,967 A | 1/1993 | Rosenfeld et al. | |
| 5,197,618 A | 3/1993 | Goth | |
| 5,265,745 A | 11/1993 | Pereyra et al. | |
| 5,319,475 A | 6/1994 | Kay et al. | |
| 5,514,434 A * | 5/1996 | Lofgren | 428/36.6 |
| 5,514,442 A | 5/1996 | Galda et al. | |
| 5,514,470 A * | 5/1996 | Haffner et al. | 428/343 |
| 5,543,233 A | 8/1996 | Latiolais et al. | |
| 5,598,940 A | 2/1997 | Finkelstein et al. | |
| 5,601,200 A | 2/1997 | Finkelstein et al. | |
| 5,615,789 A | 4/1997 | Finkelstein et al. | |
| 5,669,521 A | 9/1997 | Wiening et al. | |
| 5,702,015 A | 12/1997 | Giles et al. | |
| 5,709,310 A | 1/1998 | Kretz | |
| 5,726,283 A | 3/1998 | Tsai et al. | |
| 5,975,304 A | 11/1999 | Cain et al. | |
| 6,027,776 A * | 2/2000 | Mueller | 428/35.2 |
| 6,082,566 A | 7/2000 | Yousif et al. | |
| 6,131,754 A | 10/2000 | Smelko | |
| 6,139,931 A | 10/2000 | Finkelstein et al. | |
| 6,194,042 B1 | 2/2001 | Finkelstein et al. | |
| 6,264,098 B1 | 7/2001 | Drummond et al. | |
| 6,277,478 B1 | 8/2001 | Kurita et al. | |
| 6,312,776 B1 | 11/2001 | Finkelstein et al. | |
| 6,378,715 B1 | 4/2002 | Finkelstein et al. | |
| 6,458,302 B1 | 10/2002 | Shifflet | |
| 6,602,309 B2 | 8/2003 | Vizulis et al. | |
| 6,659,507 B2 | 12/2003 | Banahan | |
| 6,699,566 B2 | 3/2004 | Zeiter et al. | |
| 6,705,467 B1 | 3/2004 | Kancsar et al. | |
| 6,722,272 B2 | 4/2004 | Jud | |
| 6,767,425 B2 | 7/2004 | Meier | |
| 6,866,926 B1 | 3/2005 | Smelko et al. | |
| 6,902,075 B2 | 6/2005 | O'Brien et al. | |
| 6,916,516 B1 | 7/2005 | Gerber et al. | |
| 6,946,177 B2 * | 9/2005 | Abe et al. | 428/40.1 |
| 6,955,736 B2 | 10/2005 | Rosenberger et al. | |
| 6,960,392 B2 | 11/2005 | Le Du et al. | |
| 6,974,045 B1 | 12/2005 | Trombach et al. | |
| 7,012,032 B2 | 3/2006 | Cosentino et al. | |
| 7,128,210 B2 | 10/2006 | Razeti et al. | |
| 7,182,475 B2 | 2/2007 | Kramer et al. | |
| RE39,790 E | 8/2007 | Fuchs et al. | |
| 7,316,760 B2 | 1/2008 | Nageli | |
| 7,448,153 B2 | 11/2008 | Maliner et al. | |
| 7,531,228 B2 | 5/2009 | Perre et al. | |
| 7,713,605 B2 | 5/2010 | Yousif et al. | |
| 7,740,927 B2 | 6/2010 | Yousif et al. | |
| 7,819,266 B2 | 10/2010 | Ross et al. | |
| 7,838,109 B2 | 11/2010 | Declerck | |
| 8,329,288 B2 | 12/2012 | Allegaert et al. | |
| 2002/0068140 A1 | 6/2002 | Finkelstein et al. | |
| 2002/0193820 A1 | 12/2002 | Wakuda et al. | |
| 2003/0186047 A1 * | 10/2003 | Trouilhet | 428/343 |
| 2003/0196418 A1 * | 10/2003 | O'Brien et al. | 53/490 |
| 2004/0109963 A1 | 6/2004 | Zaggia et al. | |
| 2005/0048307 A1 | 3/2005 | Schubert et al. | |
| 2005/0208242 A1 * | 9/2005 | Smelko et al. | 428/35.7 |
| 2006/0000545 A1 | 1/2006 | Nageli et al. | |
| 2006/0003120 A1 | 1/2006 | Nageli et al. | |
| 2006/0003122 A1 | 1/2006 | Nageli et al. | |
| 2006/0151415 A1 * | 7/2006 | Smelko et al. | 215/232 |
| 2007/0298273 A1 | 12/2007 | Thies et al. | |
| 2008/0026171 A1 | 1/2008 | Gullick et al. | |
| 2008/0103262 A1 | 5/2008 | Haschke et al. | |
| 2008/0156443 A1 | 7/2008 | Schaefer et al. | |
| 2008/0233339 A1 * | 9/2008 | Thorstensen-Woll | 428/99 |
| 2009/0078671 A1 | 3/2009 | Triquet et al. | |
| 2009/0142530 A1 | 6/2009 | Visioli et al. | |
| 2009/0208729 A1 | 8/2009 | Allegaert et al. | |
| 2010/0009162 A1 | 1/2010 | Rothweiler | |
| 2010/0028668 A1 | 2/2010 | Janda et al. | |
| 2010/0030180 A1 | 2/2010 | Declerck | |
| 2010/0059942 A1 | 3/2010 | Rothweiler | |
| 2010/0116410 A1 | 5/2010 | Yousif | |
| 2010/0155288 A1 | 6/2010 | Harper et al. | |
| 2010/0170820 A1 | 7/2010 | Leplatois et al. | |
| 2010/0213193 A1 | 8/2010 | Helmlinger et al. | |
| 2010/0221483 A1 | 9/2010 | Gonzalez Carro et al. | |
| 2010/0290663 A1 | 11/2010 | Trassl et al. | |
| 2010/0314278 A1 | 12/2010 | Fonteyne et al. | |
| 2011/0000917 A1 | 1/2011 | Wolters et al. | |
| 2011/0005961 A1 | 1/2011 | Leplatois et al. | |
| 2011/0091715 A1 | 4/2011 | Rakutt et al. | |

FOREIGN PATENT DOCUMENTS

| | | |
|---|---|---|
| BR | 8200231 U | 9/2003 |
| BR | 0300992 A | 11/2004 |
| DE | 691 19 934 T2 | 12/1996 |
| DE | 102 04 281 A1 | 8/2003 |
| DE | 10 2006 030 118 B3 | 5/2007 |
| DE | 10 2007 022 935 B4 | 4/2009 |
| DE | 20 2009 000 245 U1 | 4/2009 |
| EP | 0 518 411 A1 | 12/1992 |
| EP | 0 668 221 A1 | 8/1995 |
| EP | 0 444 865 B1 | 6/1996 |
| EP | 0 826 598 A2 | 3/1998 |
| EP | 0 826 599 A2 | 3/1998 |
| EP | 0 717 710 B1 | 4/1999 |
| EP | 0 915 026 A1 | 5/1999 |
| EP | 0 706 473 A1 | 8/1999 |
| EP | 0 803 445 B1 | 11/2003 |
| EP | 1 834 893 A1 | 9/2007 |
| EP | 1 837 288 A1 | 9/2007 |
| EP | 1 839 898 A1 | 10/2007 |
| EP | 1 839 899 A1 | 10/2007 |
| EP | 1 857 275 A1 | 11/2007 |
| EP | 1 873 078 A1 | 1/2008 |
| EP | 1 445 209 B1 | 5/2008 |
| EP | 1 918 094 A1 | 5/2008 |
| EP | 1 472 153 B1 | 6/2008 |
| EP | 1 935 636 A1 | 6/2008 |
| EP | 1 968 020 A1 | 9/2008 |
| EP | 1 992 476 A1 | 11/2008 |
| EP | 2 014 461 A1 | 1/2009 |
| EP | 2 230 190 A1 | 9/2010 |
| EP | 2 292 524 A1 | 3/2011 |
| FR | 2 916 157 A1 | 11/2008 |
| FR | 2 943 322 A1 | 9/2010 |
| JP | 04-173135 A | 6/1992 |
| JP | 2000-255621 A | 9/2000 |
| JP | 2004-315035 A | 11/2004 |
| KR | 10-0711073 B1 | 4/2007 |
| KR | 10-0840926 B1 | 6/2008 |
| KR | 10-0886955 B1 | 3/2009 |
| MX | PA05002905 A | 2/2006 |
| MX | 2010001867 A | 4/2010 |
| TW | 194965 | 11/1992 |
| WO | 89/02402 A1 | 3/1989 |
| WO | 97/02997 A1 | 1/1997 |
| WO | WO 9702997 A1 * | 1/1997 |
| WO | 00/66450 A1 | 11/2000 |
| WO | 03/066465 A1 | 8/2003 |

(56) References Cited

FOREIGN PATENT DOCUMENTS

| WO | 2006/018556 | A1 | 2/2006 |
|---|---|---|---|
| WO | 2006/021291 | A1 | 3/2006 |
| WO | 20061099260 | A1 | 9/2006 |
| WO | 2006/108853 | A1 | 10/2006 |
| WO | 2007/109113 | A2 | 9/2007 |
| WO | 2008/027029 | A2 | 3/2008 |
| WO | 2008/027036 | A1 | 3/2008 |
| WO | 2008/039350 | A2 | 4/2008 |
| WO | 2008/125784 | A1 | 10/2008 |
| WO | 2008/125785 | A1 | 10/2008 |
| WO | 2008/148176 | A1 | 12/2008 |
| WO | 2009/092066 | A2 | 7/2009 |
| WO | 2010/115811 | A1 | 10/2010 |
| WO | 2011/039067 | A1 | 4/2011 |

OTHER PUBLICATIONS

International Searching Authority International Search Report for International Application PCT/US2007/087520 dated Apr. 17, 2008 (2 pages).

Written Opinion of the International Searching Authority for International Application PCT/US2007/087520 dated Apr. 17, 2008 (4 pages).

The International Bureau of WIPO International Preliminary Report on Patentability for International Application PCT/US2007/087520 dated Jun. 23, 2009 (5 pages).

European Patent Office Brief Communication dated Jul. 9, 2013 regarding Opponent Alfelder Kunststoffwerke Herm. Meyer GmbH Further Written Argument filed Jun. 28, 2013 in Opposition to European Patent 1 935 636 B1, and English Translation (12 pages).

Notice of Opposition to European Patent 1 935 636 B1 by Alfelder Kunststoffwerke Herm. Meyer GmbH dated Aug. 23, 2012 (21 pages), with English translation (18 pages).

Römpp Chemie Lexikon, editors Prof. D. Jürgen Falbe and Prot Dr. Manfred Regitz, 9th Edition, vol. 2 (1990), p. 791, keyword Copolymerisation (3 pages).

Selig Sealing Products, Inc. Response to Notice of Opposition to European Patent 1 935 636 B1 by Alfelder Kunststoffwerke Herm. Meyer GmbH dated Feb. 5, 2013 (11 pages).

* cited by examiner

LAMINATE

CROSS-REFERENCE TO RELATED APPLICATIONS

This application is a U.S. national phase application filed under 35 U.S.C. §371 of International Application PCT/US2007/087520, filed on Dec. 14, 2007, designating the United States, which claims priority from European Application 06126645.8, filed Dec. 20, 2006, which are hereby incorporated herein by reference in their entirety.

FIELD

The present invention relates to a method for producing a laminate which is used in container closure systems.

BACKGROUND

It is commonplace in the packaging of a wide variety of materials ranging from pharmaceutical products to instant coffee that a closure is provided in the form of a seal connected to the neck of a container and a screw cap covering and protecting the seal which provides a re-closable cap after the seal has been removed to gain access to the container. Often the closure is designed such that the underside of the seal has a heat sensitive adhesive coating or a meltable plastics layer covered by a metal foil. The seal is placed against the neck of a container and sandwiched against it by the applied screw cap. Upon induction heating, the metal foil is heated which activates the heat sensitive adhesive layer or melts the plastic layer so that on cooling, the seal bonds to the neck of the container.

A problem encountered with such seals is a difficulty in removing the seals from containers. In this regard, this has been overcome by including a tab extending sideways from the neck of the container which may be gripped by the consumer to facilitate removal of the seal. An example of such a system is the so called "Top Tab" structure which is described fully in U.S. Pat. No. 4,961,986. This system includes a multilayer substrate which is partly delaminated to provide a tab lying usually within the circumference of the container neck. In U.S. Pat. No. 4,961,986 this is achieved by forming the substrate from multiple layers which are adhered together across only a part of their extent. U.S. Pat. No. 4,961,986 further describes that the screw cap may include some form of liner in addition to the seal material. In such a two component system, wherein the seal and liner are provided separately, is that the two components have to be fitted in two separate operations.

As this is expensive and increases the complexity of the fitting process, there has been a focus on the development of a one component seal and liner system which avoids the need for two separate fitting operations. For example, EP-A-1472153 describes a one component seal and liner system, for attaching into a screw cap, which includes a tab. In the product detailed, the seal portion of the system is adhered to the liner portion by means of a release layer such that the seal and liner release from each other with a peel strength in the range from 20 to 90 g at a rate of 1500 mm/min on a sample strip 25 mm wide.

A further tab system is the successful "Lift "n" Peel" ® commercial system. This can be comprised of a primary seal and a secondary liner or just a primary seal and is usually just a primary seal. The tab is formed by interposing a layer of polyethylene terephthalate into the primary seal which extends only over a portion of the surface area of the liner. The layer of polyethylene terephthalate is interposed between the foam layer and top EVA/PET layer. On heating, the EVA adheres to the interposed layer, and portion of foam still exposed and thus by virtue of the interposed plastics layer a tab, lying wholly within the boundaries of the liner, is formed.

In WO 97/02997, a method for including a tab in a primary seal laminate is disclosed. In this case three feeds are passed to a chill roll in contact with a nip roll. The first feed which will form the top layer of the primary seal laminate, is an ethylene-vinyl alcohol barrier layer sandwiched between two polypropylene layers. The second feed is a deadening member which may be PET and the third feed is extruded tabstock e.g. polypropylene, which forms a layer across the entire width of the laminate forming the top layer. All three feeds come into contact at the point where the chill roll and nip roll are in contact. The chill roll quenches the extruded tabstock maximising its amorphous properties and causes lamination of all three layers.

A problem which can be identified with such systems is that in attaching the system including the tab to a container to be sealed, an uneven level of bonding to the container is achieved with there being a propensity for stronger bonds to be formed under the tabbed portion of the liner as compared to the non-tabbed portion. There is a further danger that on heating a metal foil of an induction system, the top layer of the seal may burn where the heat transferred to this layer is too great.

A further problem encountered with such seals is that when used on containers which are to be stored at low temperatures, for example, in dairy applications, after storage at such temperatures, the bond between the seal substrate and tab has a tendency to fail. This means that when the seal is removed from the container on opening, because the bond fails, the tab comes away from the seal substrate leaving the seal substrate adhered to the container rather than removing the seal substrate from the container.

It is therefore clear that there is a need for a simple and cost effective method for including a tabstock in a primary seal laminate which solves the problems of requiring producing an effective tab and achieving an even level of bonding to the container to be sealed.

SUMMARY

In this regard, the present invention provides a method for producing a primary laminate including a tabstock comprising the steps of:

(a) feeding a seal laminate including a hot melt adhesive layer, a foil layer and a top foam layer to a laminating station;

(b) continuously feeding a tabstock, which is narrower than the seal laminate, towards the laminating station such that the bottom of the tabstock and the top foam layer of the seal laminate come into non-adhesive contact to form a primary substrate, the top face of which is partly comprised of the top face of the tabstock and partly comprised of the top foam layer of the seal laminate prior to reaching the laminating station;

(c) continuously feeding a plastic film stock which has top and bottom surfaces to the laminating station so the bottom surface of the plastic film stock is in contact with the top face of the primary substrate and (d) continuously extruding a polymeric adhesive which is a copolymer of ethylene and an alkyl(alk)acrylate having a melt flow index 1 to 10 dg/min (190° C., 2.16 kg) between the top face of the primary substrate and bottom surface of the plastic film stock such that the two are adhered together.

The bond strength between the top foam layer and the plastic film stock is preferably greater than 15N/12.5 mm at 330 mm/min when the laminating plastic film and tabstock is pulled at 90° to the longitudinal edge of the tabstock from the seal laminate with a separation angle of 180°. In the present specification reference to upper and lower surfaces of components refers to the orientation of the components in the seal formed from the laminate when the seal is in use on a container in the upright position.

The apparatus required for the method of the present invention must have separate unwind stations for the laminate feeds that are arranged to enable simultaneous unwinding. The laminate feeds are fed to a lamination station comprising a nip between two rollers. At this point the feeds are adhered to each other to produce the primary laminate including a tabstock. The adhesive is applied vertically downwards as a curtain into the nip where the feed rollers are in contact. The speed of the feed rollers which form the nip should be faster than the rate of application of adhesive to avoid build up of the molten adhesive in the nip which might result in an uneven coating. The adhesive is applied directly from the die head of an extruder.

The top layer of the seal laminate is a foam layer. It has been found that the inclusion of a foam layer is important in order to ensure that an even seal to the container ultimately to be sealed is achieved. More specifically, this foam layer has a cushioning effect such that there is an equalization of the pressure that is exerted around the circumference of a vessel closing assembly cut from the laminate in the cap fitted on to a container as induction heating takes place to adhere the liner to the neck of the container. Thus the difference in thickness of the non-tabbed portion as compared to the tabbed portion, does not result in a difference in the strength of the bond formed under these portions. That is to say that a substantially uniform bond strength between the laminate and neck of the container is obtained around the whole circumference. The foam layer also serves the purpose of providing integrity and stiffness to the structure.

The foam may comprise several layers e.g. of coextruded materials having surface layers selected for compatibility with adjacent surfaces. The foam is preferably formed of lower alkene polymers and copolymers, preferably of ethylene and/or propylene. Foam formed from blended polymers may be used. Each of several layers may be formed of the same polymers, blended in different ratios. The foam layer may be a voided material formed by stretching polymer containing particulate material. The polymer may in these voided films, comprise polypropylene. Preferably the film is formed by including foaming agents such as dissolved gases, volatile compounds or chemically reactive compounds.

Preferably the foam layer is a pure foam and is comprised of medium or high density polyethylene (MDPE or HDPE). In order to avoid potential oozing of the extruded polymeric adhesive through the structure, it is preferred that the foam has a closed cell structure. In a preferred embodiment, the foam layer is formed from a high density foam. In a particularly preferred embodiment, the foam has a density in the range from 0.5 to 0.8 g/ml preferably in the range 0.55 to 0.75 g/ml, most preferably in the range 0.6 to 0.7 g/ml.

In a preferred embodiment of the present invention, the foam layer has a thickness in the range from 75 to 300 μm. In order to be suitable for a seal as described herein, the foam layer needs to exhibit a reasonable degree of flexibility.

The key issue with regards to the foam is the PE make up. If the proportion of LDPE is too great then the melting point as determined by DSC will be too low. This will lead to the foam melting on induction sealing, thus leaving a ring of exposed aluminum around the circumference of the seal. The melting point of the preferred foam is 129° C., and the melting point is preferably at least 120° C., more preferably at least 125° C., for instance at least 128° C.

The foil and hot melt adhesive layer of the seal laminate are conventional for induction sealing systems. The hot melt adhesive is suitable to form an adhesive seal to a food or beverage (i.e. comestible) container, for instance having a peel strength between 3 and 6N when peeling the liner from the container at 45° at room temperature.

It is preferable that one of the components of the primary laminate is printed. This can be achieved in one of two ways. The tab which forms a part of the primary laminate or the plastic film stock may include a printed layer.

As noted above, an essential feature of the primary laminate produced by the method of the present invention is the inclusion of a tabstock so that the seal will have a free tab. In the primary seal laminate produced, while the relative dimensions of the tab are not limited, it may be preferable that, for example the tab lies wholly within the circumference of the container neck and typically the tab occupies about 50% of the seal area, where the primary laminate has a diameter of less than 36 mm. The tab stock may be 10-100 mm wide, for instance 15 to 45 mm wide. The tab is provided by adhering a tab stock to the top polyester layer of the heat sealable laminate. The tabstock which is fed to the laminating station as detailed in step (b) is narrower in width than the heat sealable laminate.

Preferably the tabstock is formed of a polyester, more preferably polyethylene terephthalate. In one embodiment of the present invention, the bottom surface of the tabstock which is ultimately in contact with the top foam layer of the heat sealable laminate may be coated with a release material, for example, silicone. This minimised the possibility that during the extrusion when the finished primary seal laminate is adhered to a container by induction heat sealing, of the tabstock sticking to the top foam layer. Such release coatings are not typically necessary, however the tabstock may further include a coloured or printed layer formed of polyester and attached to the top surface of the other polyester layer by an adhesive tie layer.

In step (b), in one embodiment of the present invention, rather than feeding a single tabstock, the feed may comprise a plurality of narrow tabstocks arranged across the machine at regularly spaced apart intervals. In this way, a wide sheet of primary laminate including a tabstock may be formed which can then be slit as required (in line or in subsequent operations) thus improving the efficiency of the system.

As detailed in step (c), the third feed which is fed to the laminating station is a plastic film stock. Preferably the plastic film is selected from the group consisting of polyester, preferably polyethylene terephalate, polyamide, polypropylene or a composite. Most preferably the plastic film is polyethylene terephthalate. The width of this stock is the same as or a little narrower than the width of the heat sealable laminate. The curtain of adhesive will extend beyond the edge of the plastic filmstock, and the edge portion which forms a thicker bead is collected on the foam side of the seal laminate for trimming and removal, minimising waste of expensive PET.

This plastic film layer is preferably transparent in order that the printing of the lower layers is visible to the end user. Preferably the thickness of the plastic film stock is at least 20 μm. More preferably the thickness of the plastic film stock is in the range from 20-40 μm. In a preferred embodiment of the present invention, where the plastic film stock is PET preferably it has a surface layer with improved adhesive properties for instance formed by coextrusion. Preferably the plastic film stock is corona treated on the surface which ends up as the lowermost surface in the product, this treatment taking place upstream of the laminating station. This is done in order to ensure that the bond formed to the polymeric adhesive in step (d) is sufficiently strong Examples of suitable PET stock materials include Lumirror 10.47 which is a film that is coextruded on one side and is commercially available from Toray.

Prior to reaching the laminating station, the bottom face of the tabstock and the top foam layer of the seal laminate are brought into contact. There is no adhesion between the two feeds. The two feeds are fed in contact with one another to the laminating station. In order to achieve this, the two feeds must approach the laminating station from the same side relative to the extruder. The combination of the seal laminate and tabstock in contact with each other is referred to as a primary substrate as they are passed to the laminating station together. As the tabstock is necessarily narrower in width than the seal laminate, the top face of the primary substrate presented to the laminating station is formed partly of the top face of the tabstock and partly of the top foam layer of the seal laminate.

In the laminating station, the primary substrate is brought into contact with the plastic film stock which is fed simultaneously to the laminating station but from the opposite side of the curtain of adhesive. At the point where the top face of the primary substrate is in contact with the bottom surface of the plastic film stock, the polymeric adhesive is continuously extruded between the two surfaces. The result is that the plastic film stock is adhered over the entire surface area of the top face of the primary substrate. This means that over part of the width, the plastic stock will be adhered to the top foam layer of the seal laminate and over the remaining width, the plastic film stock will be adhered to the top face of the tabstock. This means that in a preferred embodiment where the primary laminate is cut, the result is then that a tab portion is formed which lies wholly within the circumference of the seal.

The bond formed between the top foam layer of the seal laminate and the plastic film stock must have a strength greater than 15N/12.5 mm at 330 mm/min when the tab formed of tabstock and plastic film stock is pulled from the seal laminate at 90° to the longitudinal edge of the tab (which is the machine direction of the manufacturing apparatus) with an angle of separation of from the seal laminate 180°. This is in order to ensure that when using the tab to remove the seal from a container, the tab plastic film remains adhered to the primary laminate upon application of a pulling force to the tab.

The peel test is suitably carried out using a Hounsfield Tensile Tester. Each test is carried out on three samples. The samples are cut from a strip 12.5 mm wide taken across the laminate. The sample should be at least the length of the gap between two strips of tabstock. One end of the sample should be cut through the tabstock close to one longitudinal edge, allowing the tab comprising tabstock and plastic film stock to be separated from the seal laminate. The tabstock is mounted in one jaw of the Tensile Tester, with the seal laminate being fixed into the other jaw. The jaws separate at an angle of 180°. A 50N load cell is utilised for the test. The apparatus is set so as to allow an extension of at least 25 mm, with a speed of 330 mm per minute.

The results recorded include the "break-in force", the force required to overcome the initial resistance to tab de-lamination. Subsequently the "running force" is measured, that is the force required to continue to separate the tab from the seal laminate. The running force is generally substantially constant. For the present product, the break-in force is the more important, since provided this is higher than the force required to peel the seal from the top of the container to which it is attached, the tab/plastic film will remain adhered to the seal as peeling starts, the force needed to continue this peeling being lower as the seal is peeled from the container.

The peel test is illustrated schematically in FIG. 4. This shows the tab formed of tabstock 8, adhesive 9 and plastic film 10 being mounted in the top jaw 30 of the Tensile Tester. Into the lower jaw, 31, of the Tensile Tester is mounted the seal laminate components formed of foam layer 7, foil 5 and hot melt adhesive 4. The jaws are then moved apart in the direction of the arrow, with the force required to separate the materials at the angle of 180° being recorded. The figure is schematic with the thicknesses heavily exaggerated.

Much research has gone into selecting a polymeric adhesive which can be extruded as described in the present method but does not suffer from the problem of the bond formed becoming brittle when stored at low temperatures. Additionally, the adhesive needs to be one that has a sufficiently high surface energy to adhere to plastics materials such as PET but which will not damage the metallic rollers used. In this regard, the present applicant has found that surprisingly, these problems can be overcome by selecting a polymeric adhesive which has a melt flow index in the range 1 to 10 dg/min, preferably less than 5 dg/min (190° C., 2.16 kg by ASTM D1328). The adhesive should be extrudable at temperatures low enough to avoid damage (be melting) to the foam layer, but which have high enough peel strengths at low storage temperatures and at room temperature to avoid delamination of the seal during removal from the sealed container using the adhered tab. Materials with melt points (ASTM D3418) in the range 70 to 100° C. and densities in the range 0.920 to 0.955 g/cm$^3$, for instance around 0.940-0.945 g/cm$^3$, are suitable. Copolymers of ethylene with $C_{1-12}$ alkyl (alk) acrylate esters (e.g. acrylate or methacrylate esters), especially $C_{1-4}$ alkyl esters, preferably of acrylic acid, especially butyl acrylate or methyl acrylate, may be used. The copolymers are random copolymers, for instance with mole proportions of acrylate of 0.5 to 25%, especially in the range 1 to 20%. Suitable copolymers are available in the series 2200 Bynel range by DuPont. Others having a higher melt index which may be suitable for laminates which will not be used at temperatures below freezing are the Lotryl MA series. Preferably the polymeric adhesive has a melt flow index of about 2 dg/min (190° C., 2.16 kg). A particularly preferred polymeric adhesive is an ethylene methylacrylate copolymer which has a melt flow index value of approximately 2 dg/min, sold as Bynel 22E780.

In the process of the present invention, in step (d), the polymeric adhesive is extruded through a die head. The die head is preferably at a temperature in the range from 300 to 330° C. The height of the die head from the nip is preferably in the range from 10 to 30 cm, more preferably in the range 15 to 25 cm, e.g. approximately 20 cm. The width of the slot is about 0.5-1.0 mm. The speed of the nip rollers at the laminating station is preferably in the range from 20 to 100 m/min, more preferably 50 to 80 m/min. In order that the rollers can deal with a feed which has an uneven surface due to the regions where a tab is present and the regions where a tab is not present, it is preferable that the feed rollers have a shore A hardness around 70-90, for instance a Teflon coated roller pressing against a metal chill roller.

After extrusion of the polymeric adhesive, pressure is applied to the primary laminate by chilled nip rollers downstream of the laminating station to facilitate adhesion. The chilled nip rollers are preferably at a temperature of about 23° C.

In a preferred embodiment of the present invention, the coat weight of the adhesive layer is in the range from 25 to 45 gm$^{-2}$.

In order that any printing on the tabstock can be seen, preferably the polymeric adhesive is transparent.

In a further aspect of the present invention, the primary laminate including a tabstock maybe subsequently wound onto a final roll optionally after slitting. Alternatively slitting may be carried out in a separate step, e.g. in a separate location.

The seal stock laminate of the present invention is generally formed in wide strips. Therefore in order to form the tabs, it is necessary to cut the wide strips of seal stock laminate into narrower strips. These narrower strips can then be punched or cut to form a seal ready to be applied to a container. The slitting of the wide strips into narrower strips needs to be done with precision in order to ensure that the cuts are made at the correct positions to produce the tabs. The seal can then be punched from the narrower strips from the slitting step and fixed inside the top of a screw cap. This may be carried out in a procedure and/or location separate to the method of making the seal stock laminate. The container to which the seal is attached may be made of glass or plastic material such as polyethylene, polyester, polyvinyl chloride, polypropylene or acrylonitrile-butadiene-styrene polymer.

A screw cap equipped with a seal as described above may be screwed on to the open neck of a container thus sandwiching the seal between the open neck of the container and the top of the cap. The seal is then adhered via the hot melt adhesive on the lower surface of the laminate to the open neck of the container by induction heating.

As has been described above, one of the aims of the present invention is to provide a primary laminate including a tab which produces a seal that can still be effective even after prolonged storage of the laminate at low temperatures. In this regard, the present applicant has developed a rigorous test for determining whether a given seal is likely to fail at low temperatures. The primary laminate including a tabstock as produced by the method according to the present invention is cut into three sample discs to be attached to the neck of a container. Samples were taken from three different positions on the laminate, specifically the left hand side, middle and right hand sides. Two different types of container are tested, the first being a 1 liter polyethylene chimney type bottle used in dairy applications and the second being a polyester 150 ml so-called 'round packer' bottle. The samples discs were sealed to the neck of these containers using the sealing head and conditions as shown in the table below: In the meantime, a metal plate was set up on the base of a freezer and its temperature monitored by use of a calibrated thermometer fitted with a magnetic thermocouple.

TABLE 1

| SETTINGS | SEALS TO POLYETHYLENE CONTAINER | SEALS TO POLYESTER CONTAINER |
|---|---|---|
| Freezer Temperature (° C.) metal plate | −23 to −27 | −18 to −22 |
| Freezer type | Chest | Bench |
| Bottle used | 1 l chimney | 150 ml 'Round Packer' |
| Equipment | Enercon dairy sealing head | Relco Lab sealing head |
| On torque (N) | 1.5 | 1.2 |
| Gap setting (mm) | 8 | 4 (4 × 1 mm EPE spacers) |
| Power setting | 75% | "1" |
| Time/speed | Speed = 24 m/min | Time = "1" |

The samples were allowed to cool for at least 2 minutes after sealing. The caps were then removed and the bottles were placed upside down in the freezer in direct contact with the metal plates on the base of the freezer. The sample was allowed to stand for a minimum of 2 minutes. The seals were then removed from the necks of the bottles while still in the freezer. Where the whole of the seal could be removed from the neck of the container without any delamination of the top plastics film stock from the adhesive, a positive result is noted. A sample fails where the plastic layer delaminates from the foam, which can be observed as surface of the top plastic film layer is completely transparent rather than having foam still adhered to it. Where a sample fails it is tested again the following day. If the problem still persists, the sample is rejected.

One advantage of seals produced by the method of the present invention is that they can be used universally for sealing containers of comestibles requiring storage at low or high temperatures, even down to as low as −30° C. or as high as 30° C. The invention is of particular utility where the storage temperature is in the range 0 to 6° C.

BRIEF DESCRIPTION OF THE DRAWINGS

An embodiment of the invention will now be described with reference to the following figures, in which.

DETAILED DESCRIPTION

Example 1

Figure 1:
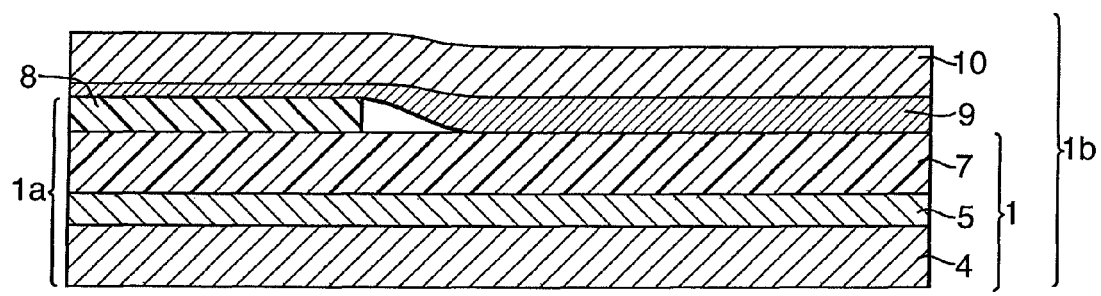
FIG. 1 is a cross section through an example of a primary laminate including a tabstock as formed according to the method of the present invention with a vertical dimension greatly exaggerated.

A seal laminate (1) comprising heat sealable (hot-melt) layer (4) for adhesion to a container to be sealed, a foil layer (5) and a top layer of polyethylene foam (7) is obtained commercially from Isco Jacques Schindler. This seal laminate is rolled onto a first feed roll (13) in the laminating apparatus.

The second feed roll (14) in the laminating apparatus is the source of the tabstock, which in this case, is a layer of polyethylene terephthalate (8). The width of the layer of polyethylene terephthalate (8) is in the range from 25-60 mm.

A third feed roll (15) is loaded with the plastics film stock, in this case a PET stock (10) which can be obtained commercially from Toray, Europe. The thickness of the PET stock (10) is in the range from 23-36 μm. The PET stock (10) used is a co-extruded PET material available as Lumirror 10.47 from Toray. The coextruded surface layer ensures optimal adhesion to the adjacent foam layer of the seal laminate.

The seal laminate (1), tabstock (8) and PET stock (10) are simultaneously fed to the laminating station (6) where an extruder (17) is positioned vertically above the nip between rollers (18 and 19). Prior to reaching the laminating station (6), the seal laminate (1) and tabstock (8) are brought into contact to form a primary substrate (1*a*).

Figure 2:
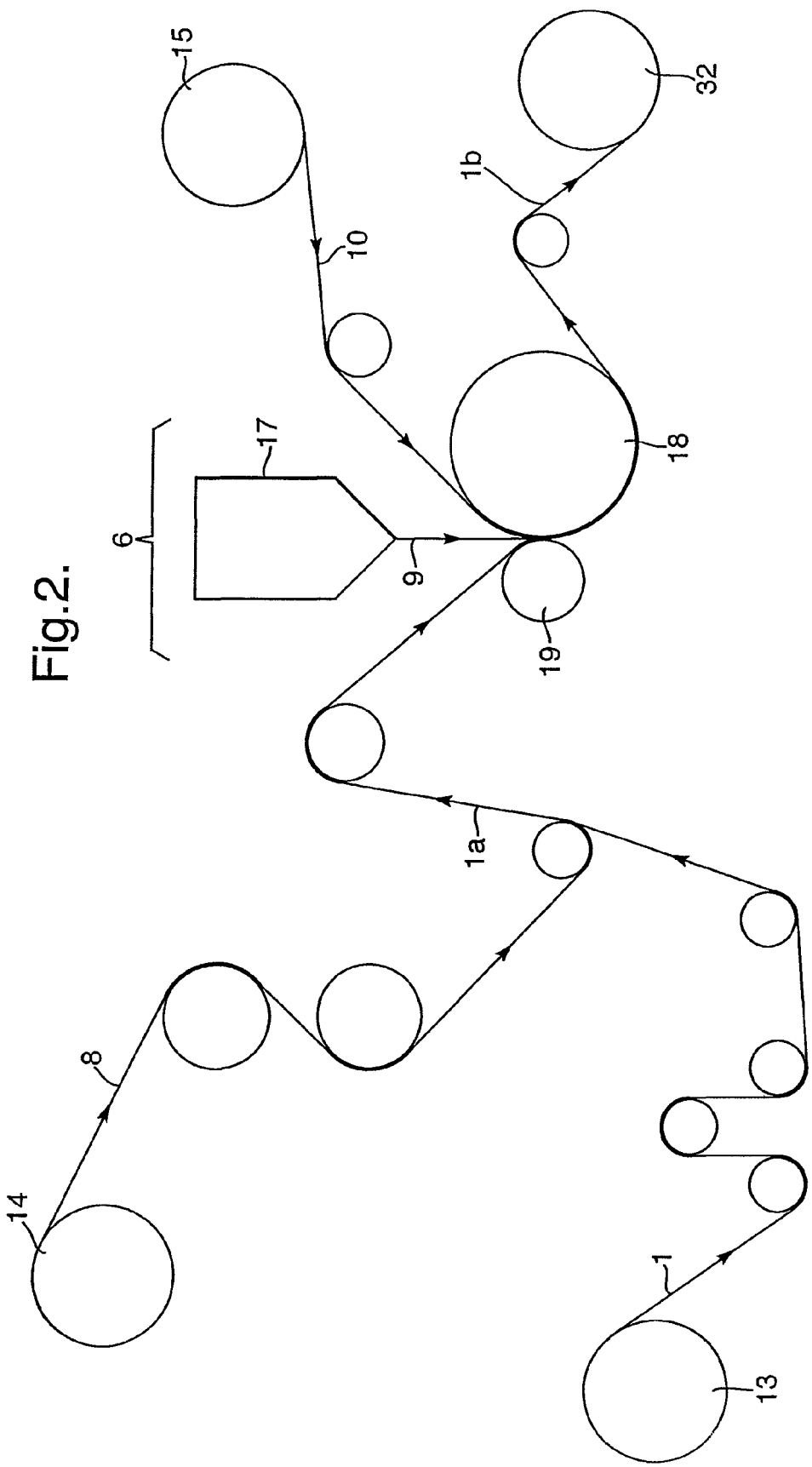
FIG. 2 is a schematic diagram of the laminating apparatus used in the method of the present invention.
Figure 3:
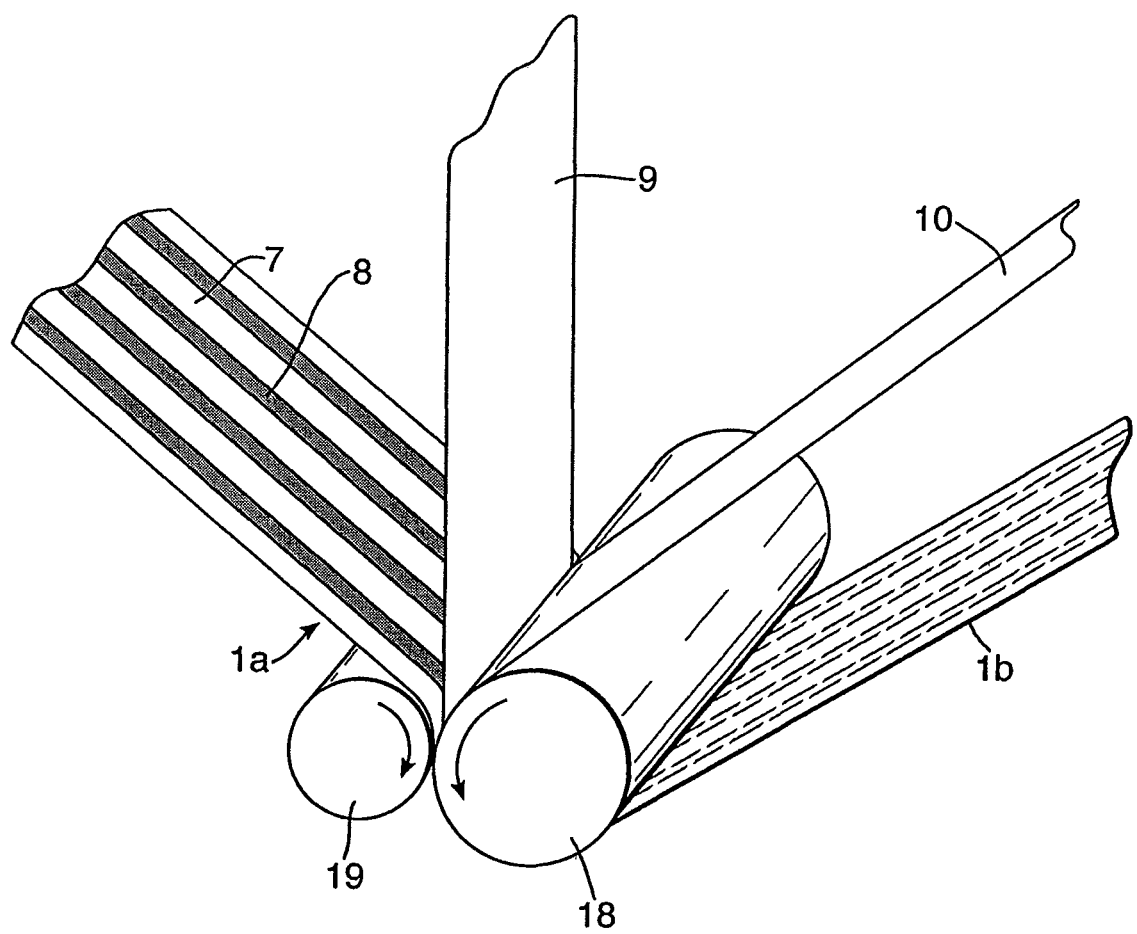
FIG. 3 is a perspective view of a part of the apparatus illustrated in FIG. 2.

Ethylene methyl acrylate copolymer (9) with a melt flow index of 2 dg/min (190° C., 2.16 kg (ASTM D1238)) is then extruded continuously as a curtain from the extruder (17) between the top face of the primary laminate (1a) and the bottom face of the PET stock (10). The height of the die head above the nip was about 20 cm. The extrusion conditions i.e. the weight of adhesive being extruded, its, speed and extruder head temperature, were such that a temperature of greater than about 200° C., for instance as much as about 250° C. is attained at the nip for adhesion. Roller 18 is a chilled stainless steel roller, while roller 19 has a Teflon coated surface with Shore A hardness of 75. The rollers (18) and (19) are moving at a speed of 70 m/min relative to the speed of application of the adhesive, the pressure between them selected to avoid the curtain creasing at the nip. The bottom face of the PET stock (10) and the resulting primary laminate (1b) including a tabstock is passed with the bottom face of the PET stock in contact with a chill roller (18) at a temperature of about 23° C. to be rolled on to a final product roll (32). This process is illustrated schematically in FIG. 2.

Figure 4:
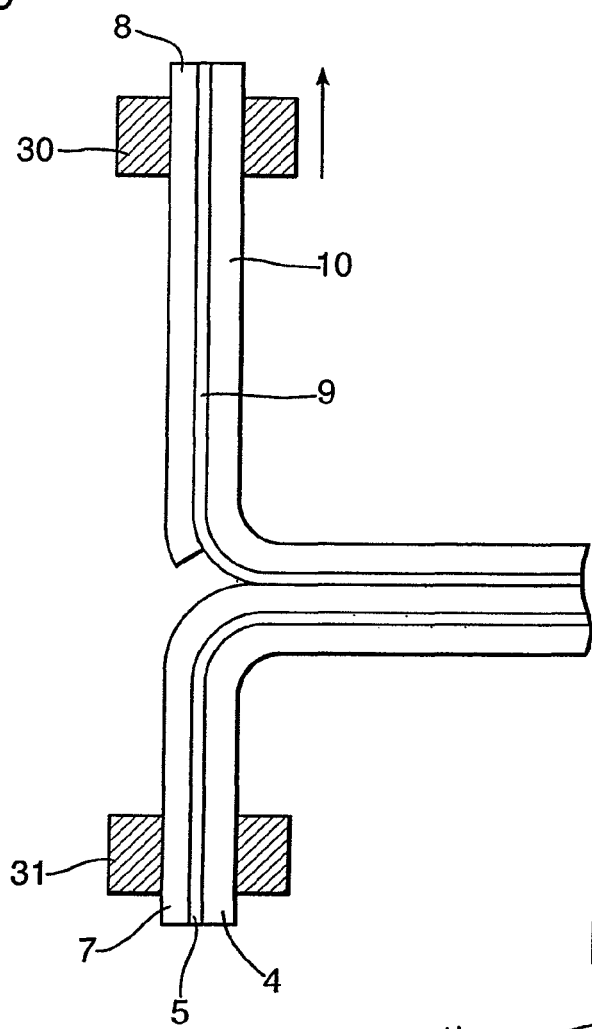
FIG. 4 is a cross section through a sample of the primary laminate being subjected to the 180° peel test to check the strength of the extruded adhesive.
Figure 5:
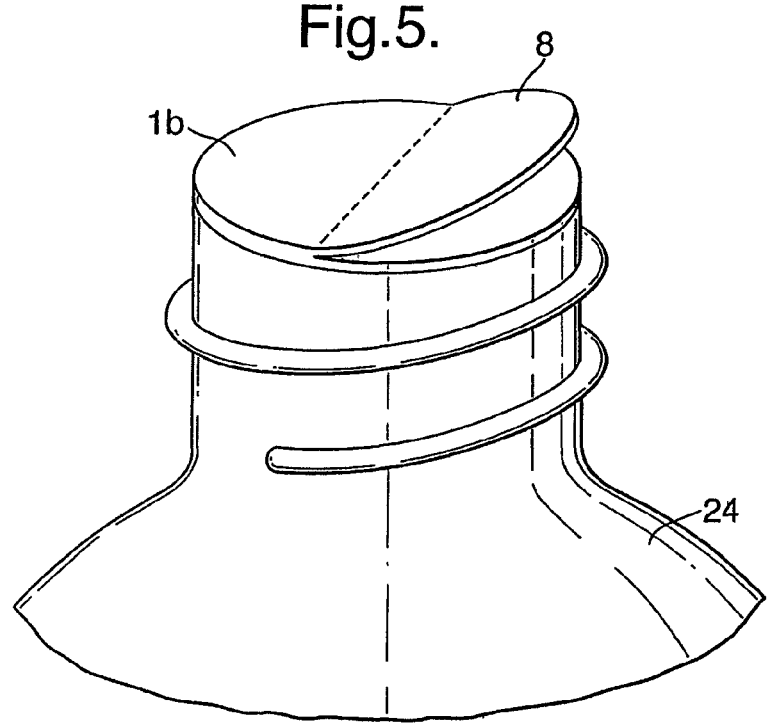
FIG. 5 is a perspective view showing the seal in place on the neck of a container.

The break-in peel strength was measured as explained above and illustrated in FIG. 4, of a primary laminate formed using a PET stock (10) thickness of 36 μm and a PET tabstock thickness of 12 μm onto the seal laminate upper surface of polyethylene foam, wherein the coat weight of the extruded ethylene methyl acrylate copolymer (9) was 40 gm$^{-2}$. The value was greater than 15N/12.5 mm at 330 mm/min.

The coat weight was determined as follows: a 0.5 m to 1 m length of paper backed polyester which has a width of 1 m was passed to the laminating station between primary substrate 1a and resin 9. A curtain of the ethylene methyl acrylate copolymer was then extruded continuously between the top polyester face of the paper backed polyester and the bottom face of the PET stock (10) under the run conditions of the line. Several 10×10 cm samples were then cut across the width of the web and their weight in g was recorded. The weight of the paper backed polyester and PET stock (10) were subtracted from this figure and the result was multiplied by 100 to give a coat weight in gm$^{-2}$.

The seal stock laminate was then cut into narrow strips. From these strips, circular discs were punched to form discs of the seal stock laminate (16) i.e. seals. The seals are fixed inside screw caps. The screw cap equipped with the seal is then screwed onto the open neck of the bottle. The cap and bottle are then subjected to an induction heating step in which the foil is heated around its periphery by the generation of eddy currents within it, which, in turn, melts the heat sealable layer (4) to bond the seal to the open neck of the bottle.

The invention claimed is:

1. A method for producing a primary laminate including a tabstock comprising the steps of:
   (a) feeding a seal laminate including a heat seal layer, a foil layer and a top foam layer between opposing rollers of a laminating station;
   (b) continuously feeding a tabstock, which is narrower than the seal laminate, towards the laminating station such that the bottom of the tabstock and the top foam layer of the seal laminate come into non-adhesive contact to form a primary substrate, the top face of which is partly comprised of the top face of the tabstock and partly comprised of the top foam layer of the seal laminate prior to reaching the laminating station;
   (c) continuously feeding a plastic film stock which has top and bottom surfaces to the laminating station, so the bottom surface of the plastic film stock is in contact with the top face of the primary substrate; and
   (d) continuously extruding a flowable polymeric adhesive which is a random copolymer of ethylene and alkylacrylate having a melt flow index in the range from 1 to 10 dg/min (190° C., 2.16 kg) as a liquid curtain directly to a nip formed between opposing surfaces of the opposing rollers and between the top face of the primary substrate and bottom surface of the plastic film stock and cooling so that the foam and the plastic film are adhered together wherein a temperature of flowable polymeric adhesive at the nip is greater than a melting point of the top foam layer.

2. A method according to claim 1 in which the peel strength of the bond between the plastic film and the seal laminate is greater than 15N/12.5 mm at 330 m/min when the laminate of plastic film and tabstock is peeled at 90° to the longitudinal edge of the tabstock with an angle of separation of 180°.

3. The method according to claim 1, wherein the bottom layer of the plastic film stock or the top surface of the tabstock have been printed.

4. The method according to claim 1, wherein the plastic film stock is formed from a material selected from the group consisting of polyester, polyethylene terephthalate, polyamide, polyethylene and composites of the aforementioned materials.

5. The method according to claim 4, wherein the plastic film stock is formed from polyethylene terephthalate.

6. The method according to claim 1, wherein the top foam layer of the seal laminate comprises medium or high density polyethylene.

7. The method according to claim 1, wherein the top foam layer of the seal laminate has a thickness in the range from 75 to 300 μm.

8. The method according to claim 1, wherein the top foam layer has a density in the range from 0.55 to 0.75 g/ml.

9. The method according to claim 1, wherein in step (b), the tabstock comprises a plurality of narrow strips of tabstock arranged at regularly spaced intervals across the width of the seal laminate.

10. The method according to claim 1, wherein in step (d), the polymeric adhesive is extruded to give a coat weight in the range from 25 to 45 gm$^{-2}$.

11. The process according to claim 1, wherein the plastic film stock has a thickness in the range from 20 to 40 μm.

12. The method according to claim 1, wherein the polymeric adhesive is an ethylene methyl acrylate copolymer.

13. The method according to claim 12, wherein the ethylene methyl acrylate copolymer has a melt index (ASTM D1238) in a range from 1 to 8 dg/min (190° C., 2.16 kg).

14. The method according to claim 1, wherein the foil layer is aluminum foil.

15. The method according to claim 13 wherein the ethylene methyl acrylate copolymer has a melt index in a range of 1 to 3 dg/min.

16. A method for producing a primary laminate including a tabstock comprising the steps of:
   (a) feeding a seal laminate including a heat seal layer, a foil layer and a top foam layer having a melting point between opposing rollers of a laminating station;
   (b) continuously feeding a tabstock, which is narrower than the seal laminate, towards the laminating station such that the bottom of the tabstock and the top foam layer of the seal laminate come into non-adhesive contact to form a primary substrate, the top face of which is partly comprised of the top face of the tabstock and partly comprised of the top foam layer of the seal laminate prior to reaching the laminating station;

(c) continuously feeding a plastic film stock which has a thickness in the range from about 20 to about 40 μm and top and bottom surfaces to the laminating station, so the bottom surface of the plastic film stock is in contact with the top face of the primary substrate;

(d) continuously extruding a flowable polymeric adhesive which is a random copolymer of ethylene and alkylacrylate having a melt flow index in the range from about 1 to about 10 dg/min (190° C., 2.16 kg) as a liquid curtain directly to a nip formed between opposing surfaces of the opposing rollers and between the top face of the primary substrate and bottom surface of the plastic film stock where a rotational speed of the opposing rollers is controlled relative to a rate of application of the flowable polymeric adhesive and cooling so that the foam and the plastic film are adhered together; and one or more of extrusion temperature, weight of polymeric adhesive, and extrusion flow rate are selected such that a temperature of the polymeric adhesive at the nip is greater than the melting point of the top foam layer and so that a temperature differential between the temperature of the polymeric adhesive at the nip and the melting point of the top foam layer is between about 70° C. and about 130° C. so that the top foam layer is not damaged by melting upon application of the polymeric adhesive.

17. The method according to claim 16, wherein the polymeric adhesive is an ethylene methyl acrylate copolymer that is extruded to give a coat weight in the range from about 25 to about 45 gm$^{-2}$.

18. The method according to claim 16, wherein the top foam layer has a melting point from about 120° C. to about 129° C. and the temperature of the polymeric adhesive at the nip is about 200° C. to about 250° C.

19. The method according to claim 18 wherein the ethylene methyl acrylate copolymer has a melt index in a range of about 1 to about 3 dg/min.

20. A method for producing a primary laminate including a tabstock comprising the steps of:

(a) feeding a seal laminate including a heat seal layer, a foil layer and a top foam layer having a melting point between opposing rollers of a laminating station;

(b) continuously feeding a tabstock, which is narrower than the seal laminate, towards the laminating station such that the bottom of the tabstock and the top foam layer of the seal laminate come into non-adhesive contact to form a primary substrate, the top face of which is partly comprised of the top face of the tabstock and partly comprised of the top foam layer of the seal laminate prior to reaching the laminating station;

(c) continuously feeding a plastic film stock which has a thickness in the range from about 20 to about 40 μm and top and bottom surfaces to the laminating station, so the bottom surface of the plastic film stock is in contact with the top face of the primary substrate;

(d) continuously extruding a flowable polymeric adhesive which is a random copolymer of ethylene and alkylacrylate having a melt flow index in the range from about 1 to about 10 dg/min (190° C., 2.16 kg) as a liquid curtain directly to a nip formed between opposing surfaces of the opposing rollers and between the top face of the primary substrate and bottom surface of the plastic film stock where a rotational speed of the opposing rollers is controlled relative to a rate of application of the flowable polymeric adhesive and cooling so that the foam and the plastic film are adhered together; and the polymeric adhesive being an ethylene methyl acrylate copolymer that is extruded at a temperature, at a flow rate, and at a distance directly above the nip so that a temperature of the polymeric adhesive at the nip is greater than the melting point of the top foam layer and so that a temperature differential between the polymeric adhesive at the nip and the melting point of the top foam layer does not melt the top foam layer yet forms a bond between the plastic film and the seal laminate greater than about 15N/12.5 mm at about 330 m/min when the laminate of plastic film and tabstock is peeled at about 90° to the longitudinal edge of the tabstock with an angle of separation of about 180° to give a coat weight in the range from about 25 to about 45 gm$^{-2}$.

21. The method according to claim 20, wherein one or more of extrusion temperature, weight of polymeric adhesive, and extrusion flow rate are selected such that the temperature differential is between about 70° C. and about 130° C.

22. The method according to claim 21, wherein the polymeric adhesive is extruded to give a coat weight in the range from about 25 to about 45 gm$^{-2}$.

23. The method according to claim 21, wherein the top foam layer has a melting point from about 120° C. to about 129° C. and the temperature of the polymeric adhesive at the nip is about 200° C. to about 250° C.

24. The method of claim 1, wherein one or more of extrusion temperature, weight of polymeric adhesive, and extrusion flow rate are selected such that a temperature differential between the temperature of the polymeric adhesive at the nip and the melting point of the top foam layer is between about 70° C. and about 130° C.

25. The method according to claim 24, wherein the top foam layer has a melting point from about 120° C. to about 129° C. and the temperature of the polymeric adhesive at the nip is about 200° C. to about 250° C.

* * * * *